United States Patent
Shapiro et al.

(10) Patent No.: US 6,370,535 B1
(45) Date of Patent: Apr. 9, 2002

(54) SYSTEM AND METHOD FOR STRUCTURED NEWS RELEASE GENERATION AND DISTRIBUTION

(75) Inventors: Eileen C. Shapiro, Cambridge, MA (US); Steven J. Mintz, Saddle River, NJ (US)

(73) Assignee: NewsGems LLC, Cambridge, MA (US)

( * ) Notice: Subject to any disclaimer, the term of this patent is extended or adjusted under 35 U.S.C. 154(b) by 0 days.

(21) Appl. No.: 09/378,686

(22) Filed: Aug. 20, 1999

(51) Int. Cl.[7] .............................................. G06F 17/30
(52) U.S. Cl. .................... 707/100; 707/102; 707/10; 707/6; 707/7; 707/500; 709/217; 709/227; 709/201; 709/203; 705/26; 705/27
(58) Field of Search .................... 707/100, 10, 102, 707/6, 7, 500; 709/203, 217, 227, 201; 705/26, 27

(56) References Cited

U.S. PATENT DOCUMENTS

| | | | |
|---|---|---|---|
| 5,384,703 A | | 1/1995 | Withgott et al. ............. 707/531 |
| 5,418,951 A | | 5/1995 | Damashek ....................... 707/5 |
| 5,537,586 A | | 7/1996 | Amram et al. .................. 707/3 |
| 5,649,186 A | * | 7/1997 | Ferguson ........................ 707/10 |
| 5,761,662 A | * | 6/1998 | Dasan ........................... 707/10 |
| 5,799,304 A | * | 8/1998 | Miller ........................... 707/7 |
| 5,819,269 A | * | 10/1998 | Uomini .......................... 707/7 |
| 6,038,573 A | * | 3/2000 | Parks ........................... 707/513 |
| 6,141,007 A | * | 10/2000 | Lebling et al. ............. 345/339 |

FOREIGN PATENT DOCUMENTS

WO WO 99/27467 6/1999

OTHER PUBLICATIONS

J.H. Morin, "HyperNews, a Hypermedia Electronic–Newspaper Environment Based on Agents", IEEE, System Sciences, Proceedings of the Thirty–First Hawaii International, vol. 2, 1998, pp. 58–67.*

Y. Quintana, "Design of an Object–Oriented Multimedia Database for Personalized Multimedia News", IEEE, Electrical and Computer Engineering, Canadian Conference, 1996, pp. 282–285.*

Chahuneau et al: "SGML Template Driven Database Extraction: A New Approach to Report Generation:" Online! Jul. 21, 1998, p. 1–7 XP002124848, Retrieved from the Internet: URL:http://www.oasis-open.org/cover/chahuneauSGML96.html retrieved on Dec. 6, 1999!

Database Inspec Online! The Institution of Electrical Engineers, Stevenage, GB: Inspec No. 2320330, Aug. 1984 "Press Office System" XP002168896 abstract & Press Office System: Which Office System?, vol. 5, No. 8, Aug. 1984, pp. 23–24.

Gralla, P., How E–Mail Works, *How the Internet Works,* Ziff–Davis Press, 44–49, 1996.

www.andromedia.com "Andromedia ™" (3 pages).
www.engage.com "Discover Profile Driven Internet Marketing" (9 pages).
www.lifeminders.com "Free Sanity in a Crazy World" (6 pages).
www.looksmart.com "LookSmart SM" (4 pages).
www.o-pinion.com "OnlineOpinion" (8 pages).

* cited by examiner

*Primary Examiner*—Jack Choules
*Assistant Examiner*—Cheryl Lewis
(74) *Attorney, Agent, or Firm*—Bromberg & Sunstein LLP

(57) ABSTRACT

A mechanism for the structured generation of a news release includes in one embodiment, (a) separately specifying the content of each of a plurality of predetermined sections of the news release; (b) storing, in a digital storage medium, the content specified for each of the sections; and (c) assembly of the news release by retrieving from the storage medium each of the stored sections. Embodiments are operative over a network such as the Internet. Relating embodiments also include a system and an E–Mail message conveying a structured news release.

34 Claims, 12 Drawing Sheets

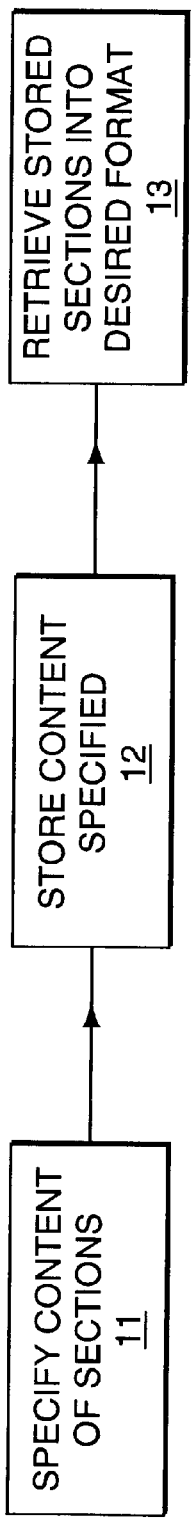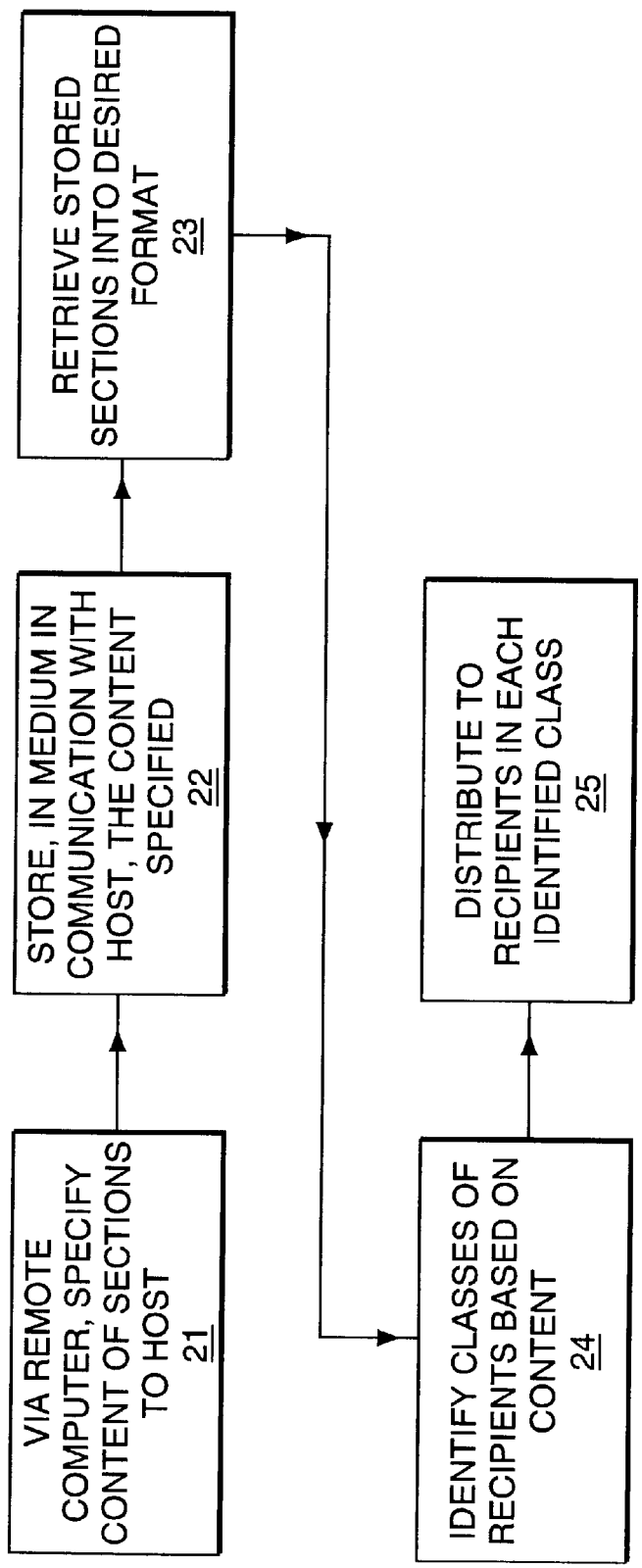

CREATING A HEADLINE

In creating a headline, the guideline is:

- *What is newsworthy about your message?*

Purpose     Grab attention and quickly determine level of interest

Guidelines
- 8 to 10 words
- Captures the essence of the subject matter
- Intrigues, informs or surprises the recipient
- Capture the tone and spirit of your message
- Establishes credibility Click here for hints for writing an Effective HEADLINE Click here for examples of Ineffective and Effective HEADLINES

Enter Your HEADLINE here

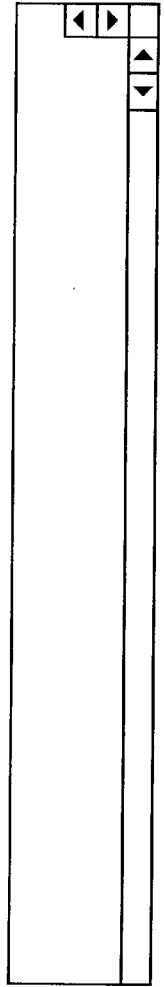

Now let's move on to the summary of your opportunity or the highlights.
Please choose below.

IN BRIEF SUMMARY        KEY MESSAGES

FIG. 5

Writing an IN BRIEF Summary

Purpose   Provides thumbnail summary and its implications for the receiver

Guidelines
- One or two short sentences
- No more than 40 words
- Specific and attention getting
- Concise and to the point Click here for hints for writing an IN BRIEF Summary Click here for examples of effective and ineffective IN BRIEF Summaries Enter Your IN BRIEF Summary

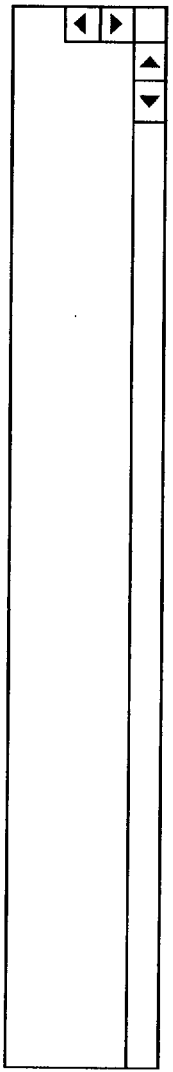

Now let's move on to writing the KEY MESSAGES of the opportunity.

FIG. 6

WRITING THREE KEY MESSAGES

Purpose   Answer the question—why should I be interested in this?

Guidelines
- Two to three statements that support the HEADLINE and entice the reader; for example
  - Answer question: "Why is this news?"
  - Present facts or statistics or other evidence to show why your story is important or interesting
- The statements don't necessarily have to relate to each other. —*BUT MUST SUPPORT THE HEADLINE*
- 30 to 40 words in total per highlight Click here for hints on writing KEY MESSAGES Click here for examples of effective and ineffective KEY MESSAGES Enter your First Message below

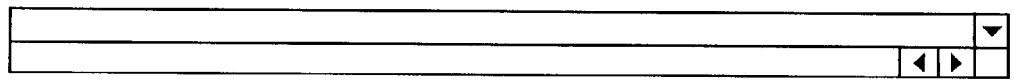

Enter your Second Message below

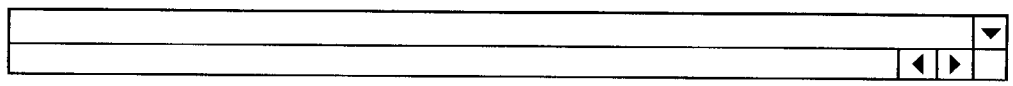

Enter your Third Message below

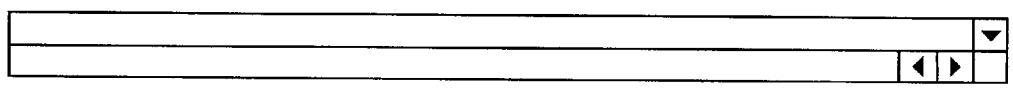

Now let's move on to the summary of your opportunity or the highlights. Please choose below.

HEADLINE    IN BRIEF SUMMARY    REVIEW COMPLETED FORMS

FIG. 7

Hints for Writing an Effective HEADLINE

- A headline is a punchy, descriptive phrase you see above a newspaper article

- Start with a phrase from your story that captures the essence in a way that makes people want to know more.

- Whittle down that phrase into a headline. Use punchy words and eliminate extraneous terms (including unnecessary prepositions, qualifiers, and descriptors). Rearranging words might help.

- To the extent you can, remove the jargon and "alphabet soup" acronyms. Restate the concept in a layperson's terms.

Examples of effective and ineffective HEADLINES

Write a HEADLINE

FIG. 8

Examples of Ineffective and Effective HEADLINES

*Example 1:*

Weak:
    Why:

Stronger:
    Why:

*Example 2:*

Weak:
    Why:

Stronger:
    Why:

*Example 3:*

Weak:
    Why:

Stronger:
    Why:

<u>Hints for writing effective HEADLINES</u>　　　<u>Write a HEADLINE</u>

FIG. 9

[example of a format]

*HEADLINE IN CAPS*

IN BRIEF:

KEY MESSAGES:

--#1:

--#2:

--#3:

WHO WILL CARE:

OTHER STORY ANGLES:

RELEASE DATE:

TIMELINESS:

KEY WORDS/TOPICS:

---

*CONTACT INFO*

--WEBLINK: [if yes, provide address]

--FULL PRESS RELEASE:[if yes,provide information/link to obtain]

--OTHER AVAILABLE MATERIALS: [list materials, and how obtain]

--CONTACT(S) at the company:

--SPECIAL NOTES:

FIG. 10

*CREATING DOOM-LOOPS IS BIG BUSINESS TODAY*

IN BRIEF: In her new book — *The Seven Deadly Sins of Business: Freeing the Corporate Mind from Doom-loop Thinking* — Eileen Shapiro shows the business beliefs, assumptions and hopes that drive even the best managers into making terrible decisions.

KEY MESSAGES:
--#1: The book is full of examples that show what the sins are, how they work, and why managers fall prey to them. Shapiro is also available to apply this framework to companies currently in the news.
--#2: Shapiro is the author of the best selling, Fad Surfing in the Boardroom. And, as with Fad Surfing, this book also includes a new "Devil's Companion to the Fad Surfer's Dictionary."
--#3: The Observer, a leading London newspaper, calls this book "brilliant." John Scully says: "If I could go back in time and take only one business book with me; this is it."
WHO WILL CARE: Anyone who wants to help make sure that his or her organization isn't accidentally headed to corporate hell in a Seven Deadly Sins handbasket.
OTHER STORY ANGLES:
--management as an under-rated skill
--current examples of companies one or more these deadly sins
--effect of these sins on current and future workforce in the U.S.
RELEASE DATE: 1 June 1999

TIMELINESS:
--U.S. pub date: April 1999 (Capstone)
--other info: Shapiro is available to comment on current news stories, using the framework (and definitions) from this book
KEY WORDS/TOPICS: Leadership, Empowerment, Management Training, Business Strategy, Corporate Performance

*CONTACT INFO*

—WEBLINK:
***website for this book is www.fadsurf.com
***this website was designed exclusively for fun—and to use cutting edge web technologies in a series of experiments (interactive games, dancing devil.gif)

FULL PRESS RELEASE?:
***www.fadsurf.com: access via the "Press Here" button on the home page —OTHER AVAILABLE MATERIALS?:
***full press pack—including author bio, sample interview, summary points for the book
***contact: Eileen Shapiro at eshapiro@hillcrestinc.com —CONTACT(S):
***author: Eileen Shapiro, eshapiro@hillcrestinc.com, or 617-495-0020

—SPECIAL NOTES:

FIG. 11

SYSTEM AND METHOD FOR STRUCTURED NEWS RELEASE GENERATION AND DISTRIBUTION

TECHNICAL FIELD

The present invention relates to systems and methods for structured generation and distribution of news releases, including over networks and particularly the Internet.

BACKGROUND ART

The prior art is familiar with applications available over the World Wide Web for providing an individual with news stories that have been automatically selected according to pre-specified criteria. On the other hand, the preparation of news stories and, more particularly, of news releases, is generally an operation that involves human effort of a kind that has not significantly changed in decades. While there are aids, such as word processing programs, that can be invoked to speed the motion of words selected by the writer onto a text-storing medium such as paper, the actual selection of the words in a news release usually involves the same exercise of creative effort and editorial judgment that has been required since the format of a news release was first developed. Indeed, part of the difficulty in writing a news release involves developing a suitable approach to the whatever happens to be the subject of the release. In this sense, a typical prior art news release is friendly neither to the creator, owing to the work involved in creating the news release, nor to the reader, owing to the effort involved in gleaning information from it.

It is not surprising, therefore, that the writing of news releases is usually left to specialists in marketing and public relations departments of businesses or to independent public relations consultants.

SUMMARY OF THE INVENTION

In a first embodiment of the present invention, there is provided a method for the structured generation of a news release. The method of this embodiment includes:

a. separately specifying content of each of a plurality of pre-determined sections of the news release, the pre-determined sections and their ordering determining in part a desired format for the news release;

b. storing, in a digital storage medium, the content specified for each of the sections; and c. assembling the news release by retrieving from the storage medium each of the stored sections in a manner consistent with the desired format.

In this connection, in a further embodiment, specifying the content includes providing responses via a set of templates. Each template in the set (which has at least one member) is structured to evince the content of the sections. In one implementation the set of templates includes a single template having locations for entering the content for each section. Alternatively, the set of templates includes a separate template for each section, and each template has a location for entering the content of a corresponding section. The predetermined sections may optionally include a headline, a summary, and a release date, and/or at least one key message and/or a section providing an identification of classes of individuals to whom the content provided in the body is expected to be relevant.

A related embodiment provides a method of automatically generating a news release over a network. In this embodiment, the method includes a. from a computer at a first location, separately specifying over a network to a host computer, content of each of a plurality of pre-determined sections of the news release, the predetermined sections and their ordering determining in part a desired format for the news release;

b. storing, in a digital storage medium in communication with the host computer, the content specified for each of the sections; and c. assembling the news release by retrieving from the storage medium each of the stored sections in a manner consistent with the desired format.

The network, in a further embodiment, is the Internet, and the host computer may be implemented as a World Wide Web server. As in the case of the earlier embodiments, the content may be specified via a set of templates in the manner described previously. Moreover, the method of this embodiment may optionally include automatically identifying classes of recipients of the news release based on further recipient content of at least one of the sections. Also optionally, the method may include distributing the news release to recipients in each identified class. Distributing the news release may be performed automatically and may include sending the news release as E-Mail over the Internet. The E-Mail may include an attachment supplying additional information.

Also provided in a related embodiment is a system for automatically generating a news release over a network. The system of this embodiment includes a. a host computer, in communication with a remote computer over a network, the host computer running a first process causing the host computer to receive, from the remote computer, separately specified content of each of a plurality of pre-determined sections of the news release, the predetermined sections and their ordering determining in part a desired format for the news release;

b. a digital storage medium, in communication with the host computer, that stores the content specified for each of the sections; and c. a second process, running on a computer in communication with the digital storage medium, that assembles the news release by retrieving from the storage medium each of the stored sections in a manner consistent with the desired format.

As described previously, in a further embodiment, the network is the Internet and the host computer is a World Wide Web. Moreover, there may be optionally a third process that identifies classes of recipients of the news release based on content of at least of at least one of the sections, and optionally a fourth process that distributes the news release as E-Mail over the Internet to recipients in each identified class. The E-Mail may include an attachment supplying additional information.

In yet another embodiment of the invention there is provided a digitally encoded E-Mail message, for transmission over a global communications network, carrying a news release. In this embodiment, the message includes:

a. a header providing network address, data, formatted for the global communications network; and b. a body having a plurality of sections, the sections including
 (i) a headline;
 (ii) a summary; and
 (iii) key points.

In a related embodiment, the body of the E-Mail message further includes a plurality of labels, each label corresponding to one of the sections, for labeling the sections. The body of the E-Mail message optionally includes a section providing an identification of classes of individuals to whom the content provided in the body is expected to be relevant. Furthermore, the E-Mail message may also include an attachment providing information supplementing information in the body. Also the body may includes a section providing a network address of a source of information that supplements information in the body. In this embodiment, the network address is optionally a URL of a site on the World Wide Web.

BRIEF DESCRIPTION OF THE DRAWINGS

The foregoing features of the invention will be more readily understood by reference to the following detailed description, taken with reference to the accompanying drawings, in which:

FIG. 1 is a block diagram of an embodiment of a method in accordance with the present invention for generating a news release.

FIG. 2 is a block diagram of an embodiment of a method in accordance with the present invention for generating and distributing a news release over a network.

FIGS. 5 through 7 illustrate templates in the form of HTML page prompting a user for input of content of the news release in the respective sections of headline, summary, and key messages.

FIGS. 8 and 9 illustrate additional information available via hyperlinks from the HTML page illustrated in FIG. 5 pertaining to entry of the headline content.

FIG. 10 shows partitioning of a news release into a number of sections, in accordance with an embodiment of the invention.

FIG. 11 shows an example of a news release utilizing the sections of the embodiment of FIG. 10.

DETAILED DESCRIPTION OF SPECIFIC EMBODIMENTS

FIG. 1 is a block diagram of an embodiment of a method in accordance with the present invention for generating a news release. In this embodiment, three activities are involved. As shown in item 11, first there is specified the content of sections of the news release. As shown in further detail below, the news release is conveniently partitioned into a number of sections. An example of such a partitioning is shown in FIG. 10. The sections include (among other things) for example the headline, a summary, key points, and a release date. The sections of the news release are ordered in a manner consistent with a desired format for the news release. The content specified for each section is in item 12 stored in a suitable digital storage medium. Finally, as shown in box 13, the news release is assembled by retrieving from the digital storage medium each of the stored sections. The retrieval is managed so as to provide a news release in the desired format. One of the benefits of this embodiment is the possibility of providing a highly structured environment in which to create the news release. This structured environment permits persons without substantial experience in marketing or public relations to create an effective news release in an efficient manner. Similarly, the format provided by embodiments of the present invention permits readers of the news release to scan quickly and efficiently the information presented in the release, and thereby determine their level of interest and/or desire for any follow-up materials.

Figure 3:
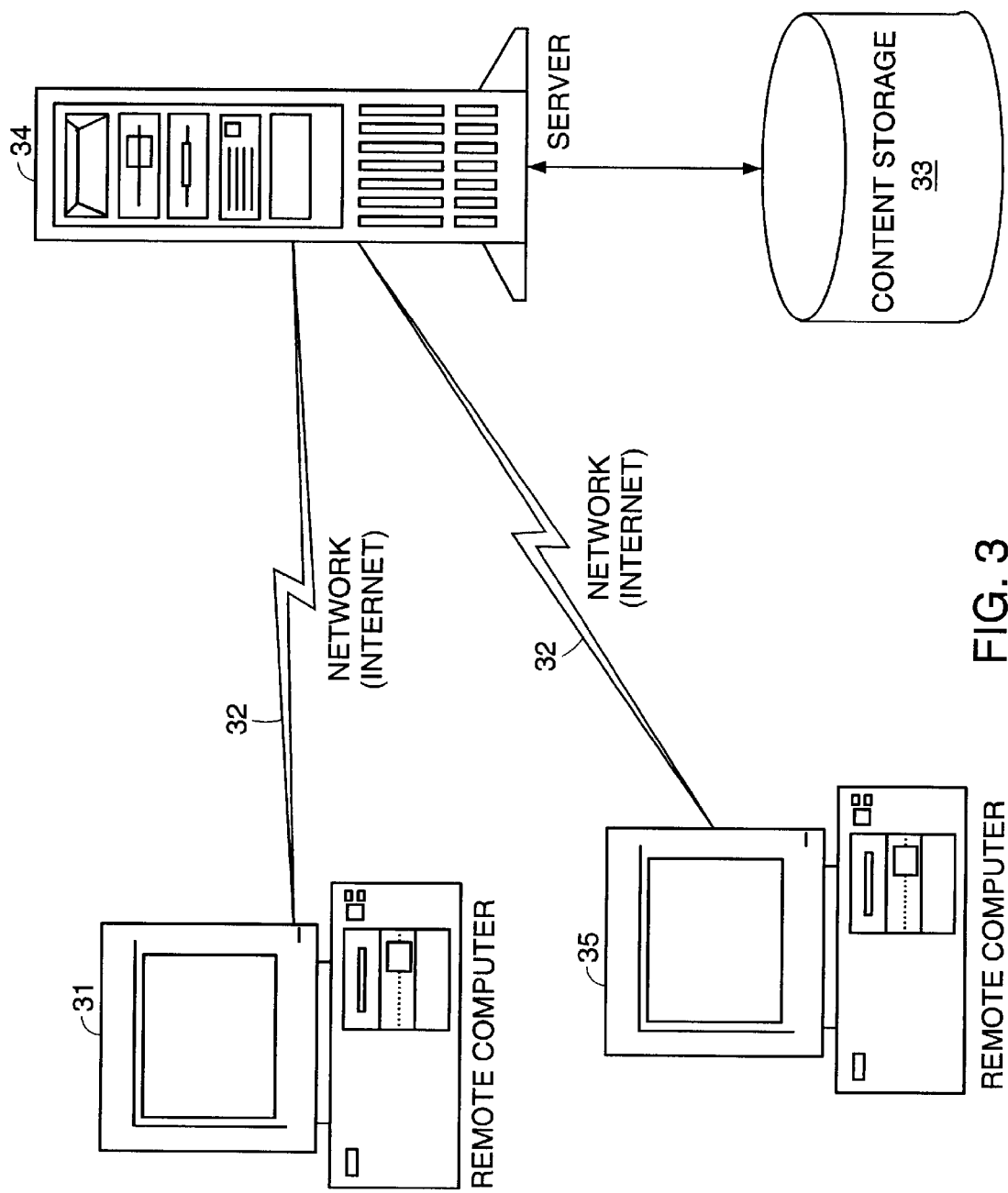
FIG. 3 is a diagram illustrating a system in accordance with the present invention for generating and distributing a news release over a network.

FIG. 2 is a block diagram of an embodiment of a method in accordance with the present invention for generating and distributing a news release over a network. In this embodiment it is assumed that the content of the news release will be specified via a remote computer 31 as shown in FIG. 3, which is in communication over a network 32 with a host computer 34. The host computer 34 which is here implemented as a server and is in communication with a digital storage medium 33 for storing (among other things) news release content. The network 32 may be implemented as the Internet, and in particular the World Wide Web. In this specific embodiment, the host computer 34 provides HTML pages for access by a remote computer such as computer 31 by means of which may be entered appropriate news release content. Shown in box 21 is the first activity of this embodiment, which in a manner analogous to the activity in box of FIG. 1 includes specifying the content of sections of the news release, but in this case the content is entered via remote computer 31 and the content is communicated over the network 32 to the host computer 34. In box 22, the host computer 34 causes the content to be stored in the digital storage medium 33 which may be realized for example, as a hard disk drive. After the content has been stored in box 23, the news release is assembled by retrieving from the storage medium each of the stored sections in a manner consistent with the desired format.

In a further embodiment, there may be included further activities associated with distribution of the news release. In particular, in box 24, there are automatically identified classes of recipients of the news release based on content of at least one of the sections in the news release. In one embodiment, information in the section KEY WORDS/ TOPICS is used to identify the classes. Alternatively, for example, it is known in the art of intelligent content management to identify key words in text and to use these key words to characterize the content of the text. See for example, U.S. Pat. No. 5,799,304 (Miller, "Information evaluation"); U.S. Pat. No. 5,649,186 (Ferguson, "System and method for a computer-based dynamic information clipping service"); U.S. Pat. No. 5,537,586 (Amram et al., "Enhanced apparatus and methods for retrieving and selecting profiled textural information records form a database of defined category structures"); U.S. Pat. No. 5,418,951 (Damashek, "Method of retrieving documents that concern the same topic"); and U.S. Pat. No. 5,384,703 (Withgott et al., "Method and apparatus for summarizing documents according to theme"), which are hereby incorporated herein by reference. Such a characterization may be used to determine classes of recipients of the news release. In particular, it is within the scope of the present invention to utilize a list of recipients, wherein each recipient is placed in one or more classes according to the interests or other characteristics of the recipient. One major group of recipients in many applications for embodiments described herein is reporters. Reporters may be placed in classes according to the types of topics they cover, for example fashion, new technology, business leaders, and so forth. However, other groups are also possible recipients and may also be placed in classes according to interests or other characteristics. For example, business managers may be targeted for news releases depending on the nature of the businesses they manage. Consumers, too, may be interested in receiving information concerning specific kinds of new products. All of these groups may be treated as recipients and placed into appropriate classes. Accordingly, in step 24, there are automatically identified classes of recipients of the news release based on content of at least of the sections of the news release. Thereafter, in box 25, there occurs the activity of distributing the news release to recipients on each identified class. In further embodiments, distribution of the news release is performed automatically and includes sending the news release as e-mail over the Internet. The e-mail may optionally include an attachment supplying additional information. Further information concerning the Internet and E-Mail is provided in the above referenced patents and, for example, in Gralla, *How the Internet Works* (Ziff-Davis Press, 1996), which is hereby incorporated herein by reference; see especially pages 44–49.

FIG. 10 provides an example of sections of a news release in accordance with an embodiment of the present invention. As can be seen in FIG. 10, these sections include the headline (called "HEADLINE"), typically up to about 10 words in length; a summary (called "IN BRIEF"), three key points (called "KEY MESSAGES"), typically no more than about 40 words each; "WHO WILL CARE", a section identifying potential audience for the news release and explaining why the story conveyed in the news release will be of interest; "OTHER STORY ANGLES", section providing other ways to position or view the story; "RELEASE DATE", the date on which the news release is first to be distributed; "TIMELINESS", information governing the useful duration of the news release; "KEY WORDS/TOPICS", providing words characterizing the content of the news release, for purposes including identifying classes of recipients. In addition there is a section on contact information that includes subsections providing links to relevant websites, information concerning the availability of a full press release, other available materials, persons who may be contacted (identified as "CONTACT(S)", and "SPECIAL NOTES". It should be noted that not all information supplied by the user in connection with a contemplated news release need be utilized in the news release as distributed. For example, information in KEY WORDS/TOPICS may be used in determining classes of recipients of the news release but may be omitted from the news release itself. In FIG. 11 is provided an example of a news release utilizing the sections set forth in FIG. 10.

Figure 4A:
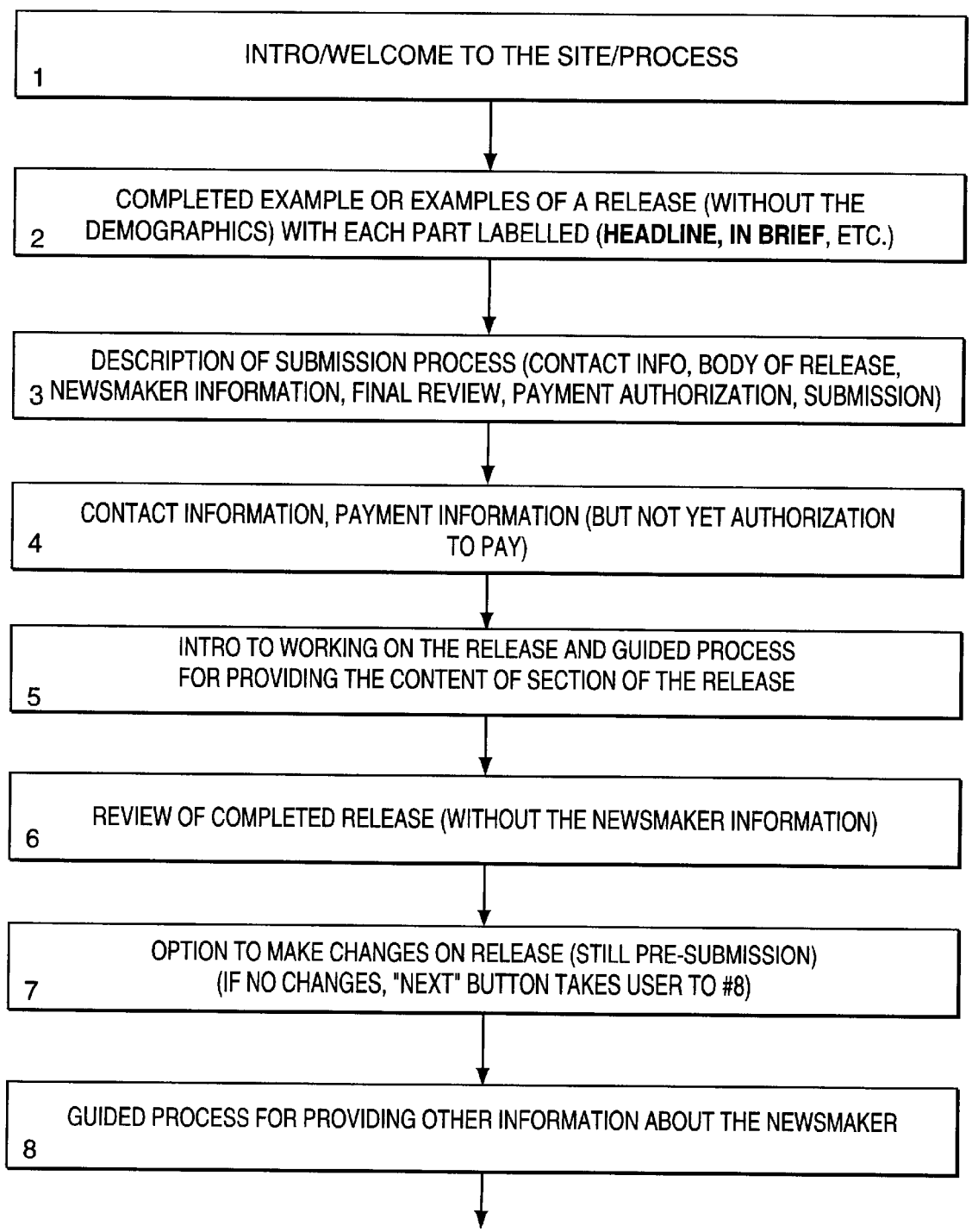
FIGS. 4A through 4C illustrate in further detail the logical flow of an embodiment similar to that of FIG. 2.
Figure 4B:
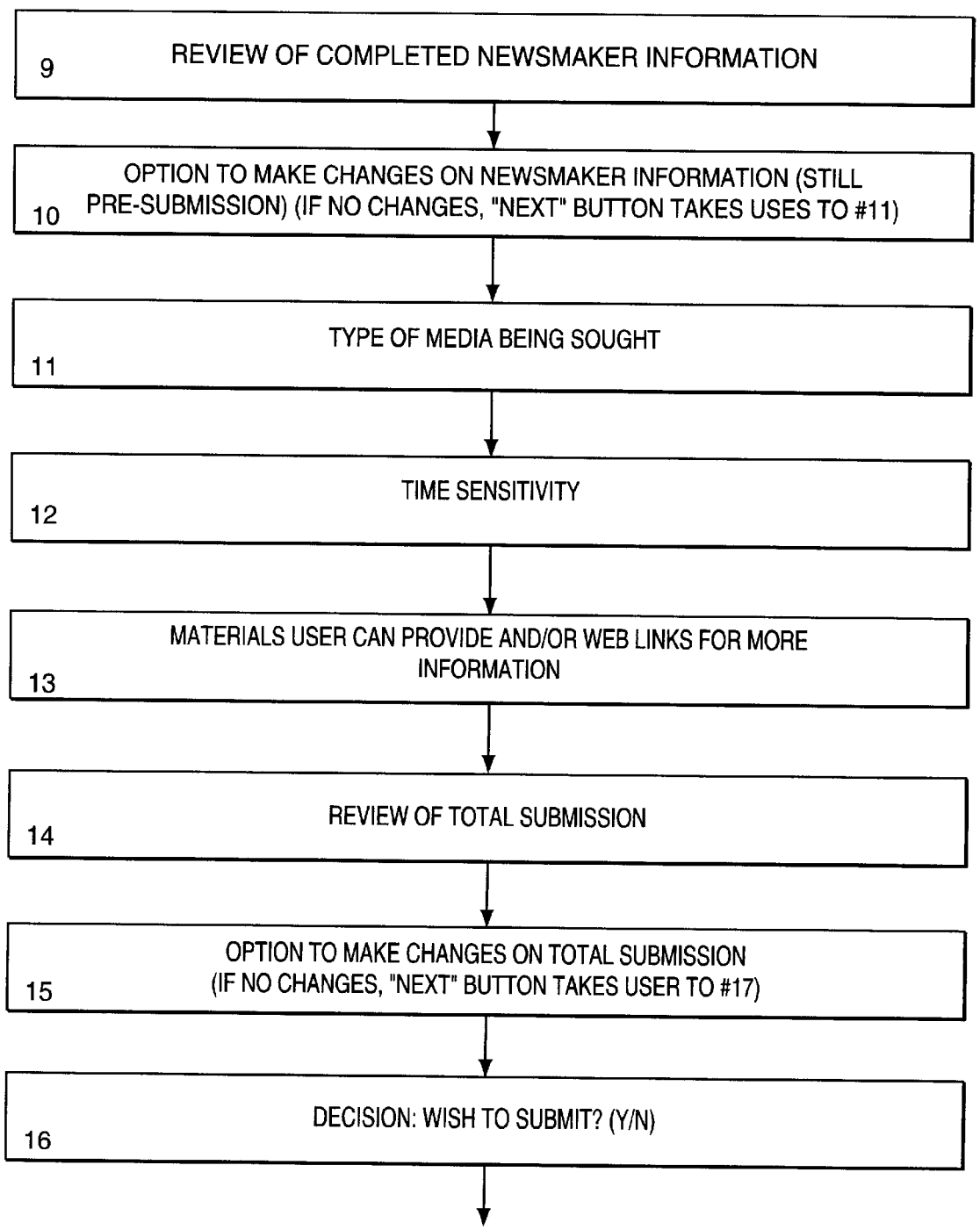
Figure 4C:
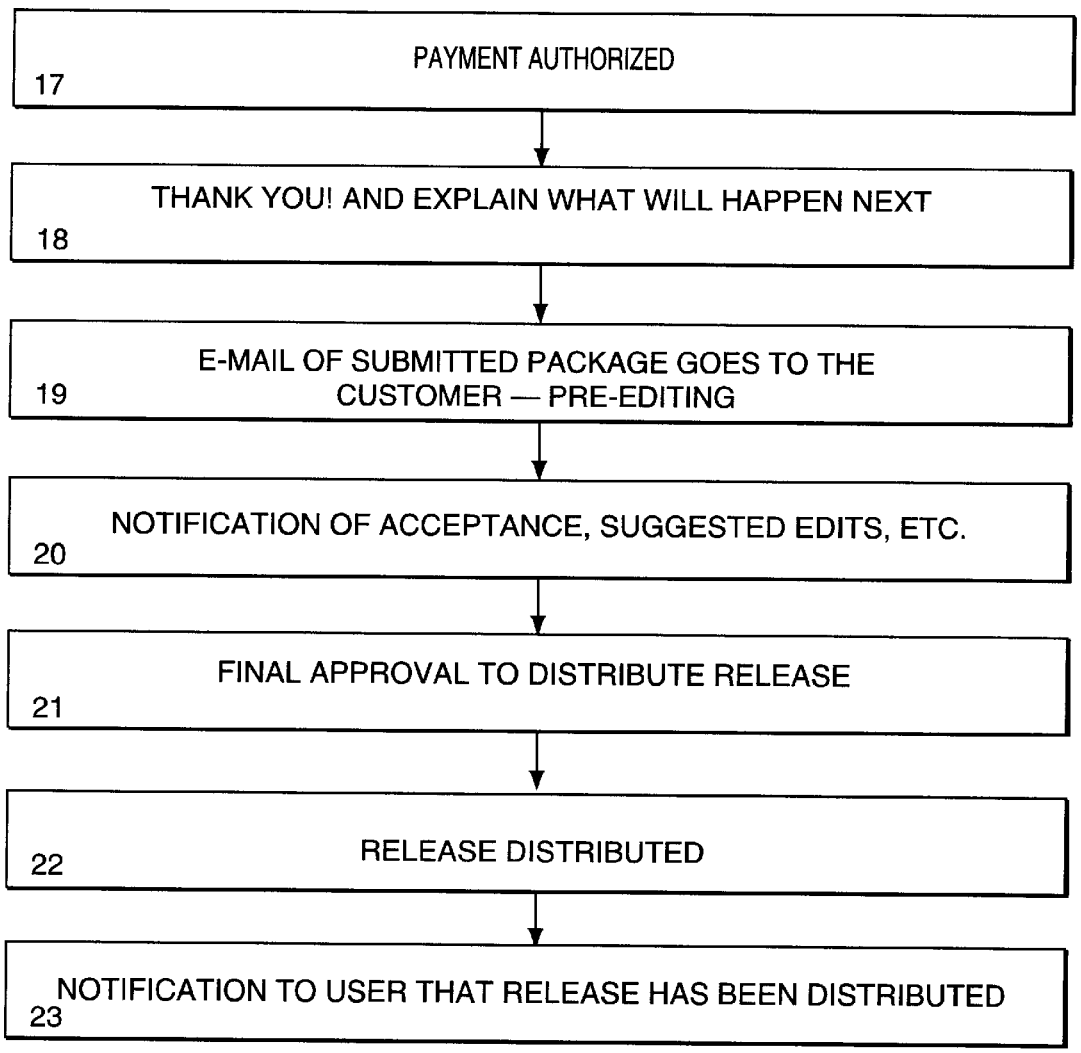

FIGS. 4A through 4C illustrate in further detail the logical flow of an embodiment similar to that of FIG. 2. In box 1, the user is presented with the home page of the Website. The home page offers the option of skipping various steps depending on user preference or experience. The user is next presented, however, in box 2 with an HTML page showing news release examples including labels of each part (that is, each section) of the news release. Next, in box 3, there is presented an HTML page that describes briefly the process flow experienced by the user in utilizing the Website to assemble a news release. In box 4, the user is provided an HTML page on which to present contact information and payment information. In box 5, the user is presented with an introduction to the process of working on the release and then is presented with a guided process for providing the content of each section of the release. This guided process may be implemented in a number of different ways. In a first implementation, the user provides content by completing templates that are provided on the Website in a manner described in further detail below in connection with FIGS. 5 through 9. Under another implementation, the user may be prompted to download templates, complete the information offline and then upload the content at a later time. Under yet a third implementation, the content may be provided by means of an interactive interview, wherein instructions, hints and questions are used to aid the user in providing a single response on each screen of a sequence of screens to cause the provision of content for each section. In box 6, the user is provided an opportunity to review the completed news release. In box 7, the user is given the opportunity to make changes to the content of the release. In box 8, the user is presented with a guided process to supply what we call "newsmaker" information, namely the name, title, address, telephone number, and e-mail address of a person to be listed as the contact on the news release, as well as additional information pertinent to the source of the news release. (The guided process operates in a manner analogous with the process described above in connection with box 5.) Referring now to FIG. 4B, in box 9, the user is provided an opportunity to review the provided newsmaker information. In box 10, the user has the option to modify the newsmaker information. In box 11, the user is prompted to identify the types of media being targeted by the news release. In box 12, the user is prompted to supply information concerning the time sensitivity of the news release. In box 13, the user is prompted to provide additional information concerning the subject matter and/or links to appropriate websites. In box 14, the user is provided an opportunity to review the entire news release submission. In box 15, the user is given the opportunity to modify the submission. In box 16, the user is prompted to authorize submission of the news release and, if the authorization is given, then in box 17 (in FIG. 4C), the user is prompted to authorize the payment mechanism for the news release generation and distribution. In box 18, the user is thanked and given an explanation and the procedures to be followed in generation and distribution of the news release. In box 19, the user is sent an e-mail of the generated news release. In boxes 20 and 21, the user provides notification of acceptance of the news release and any changes, and gives final approval to distribute the release. In box 22, the release is distributed and in box 23 the user is notified that the release has been distributed, at which time the user may also be provided with statistics associated with the distribution.

What is claimed is:

1. A method for structured generation of a news release, the method comprising:
   a. separately specifying content of each of a plurality of pre-determined sections of the news release, the pre-determined sections and their ordering determining in part a desired format for the news release;
   b. storing, in a digital storage medium, the content specified for each of the sections; and
   c. assembling the news release by retrieving from the storage medium each of the stored sections in a manner consistent with the desired format.

2. A method according to claim 1, wherein specifying the content includes providing responses via a set of templates, the set of templates having at least one member and being structured to evince the content of the sections.

3. A method according to claim 2, wherein the set of templates includes a single template having locations for entering the content for each section.

4. A method according to claim 2, wherein the set of templates includes a separate template for each section, each template having a location for entering the content of a corresponding section.

5. A method according to claim 1, wherein the predetermined sections include a headline, a summary, and a release date.

6. A method according to claim 2, wherein the predetermined sections include a headline, a summary, and a release date.

7. A method according to claim 2, wherein the predetermined sections include a set of key points, the set of key points having at least one member.

8. A method according to claim 2, wherein the predetermined sections include a section providing an identification of classes of individuals to whom the content provided in the body is expected to be relevant.

9. A method for structured generation of a news release over a network, the method comprising:
   a. from a computer at a first location, separately specifying over a network to a host computer, content of each of a plurality of pre-determined sections of the news release, the predetermined sections and their ordering determining in part a desired format for the news release;
   b. storing, in a digital storage medium in communication with the host computer, the content specified for each of the sections; and
   c. assembling the news release by retrieving from the storage medium each of the stored sections in a manner consistent with the desired format.

10. A method according to claim 9, wherein the network is the Internet.

11. A method according to claim 10, wherein the host computer is a World Wide Web server.

12. A method according to claim 9, wherein specifying the content includes providing responses via a set of templates, the set of templates having at least one member and being structured to evince the content of the sections.

13. A method according to claim 12, wherein the set of templates includes a separate template for each section, each template having a location for entering the content of a corresponding section.

14. A method according to claim 12, wherein the set of templates includes a single template having locations for entering the content for each section.

15. A method according to claim 12, wherein the predetermined sections include a headline, a summary, and a release date.

16. A method according to claim 12, wherein the predetermined sections include a set of key points, the set of key points having at least one member.

17. A method according to claim 16, wherein the data include content of at least one of the sections.

18. A method according to claim 9, further comprising:
   automatically identifying classes of recipients of the news release based on data supplied from the computer at the first location.

19. A method according to claim 18, further comprising:
   a. distributing the news release to recipients in each identified class.

20. A method according to claim 19, wherein distributing the news release is performed automatically and includes sending the news release as E-Mail over the Internet.

21. A method according to claim 20, wherein the E-Mail includes an attachment supplying additional information.

22. A system for the structured generation of a news release over a network, the system comprising:
   a. a host computer, in communication with a remote computer over a network, the host computer running a first process causing the host computer to receive, from the remote computer, separately specified content of each of a plurality of pre-determined sections of the news release, the predetermined sections and their ordering determining in part a desired format for the news release;
   b. a digital storage medium, in communication with the host computer, that stores the content specified for each of the sections; and
   c. a second process, running on a computer in communication with the digital storage medium, that assembles the news release by retrieving from the storage medium each of the stored sections in a manner consistent with the desired format.

23. A system according to claim 22, wherein the network is the Internet.

24. A system according to claim 23, wherein the host computer is a World Wide Web server.

25. A system according to claim 23, further comprising:
   a third process that identifies classes of recipients of the news release based on data obtained from the host computer.

26. A system according to claim 25, wherein the data include content of at least one of the sections.

27. A system according to claim 25, further comprising:
   a fourth process that distributes the news release as E-Mail over the Internet to recipients in each identified class.

28. A system according to claim 27, wherein the E-Mail includes an attachment supplying additional information.

29. A digitally encoded E-Mail message, for transmission over a global communications network, carrying a news release, the message, comprising:
   a. a header providing network address, data, formatted for the global communications network;
   b. a body having a plurality of sections, the sections including
      (i) a headline;
      (ii) a summary; and
      (iii) key points.

30. An E-Mail message according to claim 29, wherein the body further includes a plurality of labels, each label corresponding to one of the sections, for labeling the sections.

31. An E-Mail message according to claim 29, wherein the body also includes a section providing an identification of classes of individuals to whom the content provided in the body is expected to be relevant.

32. An E-Mail message according to claim 29, further comprising an attachment providing information supplementing information in the body.

33. An E-Mail message according to claim 29, wherein the body includes a section providing a network address of a source of information that supplements information in the body.

34. An E-mail message according to claim 33, wherein the network address is a URL of a site on the World Wide Web.

* * * * *